United States Patent
Erno et al.

(10) Patent No.: US 8,550,955 B2
(45) Date of Patent: Oct. 8, 2013

(54) PIN FOR PLANETARY GEAR SYSTEM

(75) Inventors: Daniel Jason Erno, Clifton Park, NY (US); Darren Lee Hallman, Scotia, NY (US); Fulton Jose Lopez, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 38 days.

(21) Appl. No.: 13/210,761

(22) Filed: Aug. 16, 2011

(65) Prior Publication Data

US 2012/0028755 A1    Feb. 2, 2012

(51) Int. Cl.
*F16H 57/08*    (2006.01)

(52) U.S. Cl.
USPC ............... 475/331; 475/346; 475/347

(58) Field of Classification Search
USPC ........................... 475/331, 346, 347
See application file for complete search history.

(56) References Cited

U.S. PATENT DOCUMENTS

| | | | | |
|---|---|---|---|---|
| 2,127,463 | A * | 8/1938 | Chilton | 475/347 |
| 2,749,778 | A * | 6/1956 | Kuhn | 475/347 |
| 2,848,908 | A * | 8/1958 | Hollis | 475/279 |
| 4,700,583 | A * | 10/1987 | Hicks | 74/410 |
| 4,885,959 | A * | 12/1989 | Shinjo et al. | 475/347 |
| 5,098,359 | A | 3/1992 | Chales et al. | |
| 5,558,593 | A | 9/1996 | Röder et al. | |
| 5,679,089 | A | 10/1997 | Levedahl | |
| 5,700,218 | A | 12/1997 | VanSelous et al. | |
| 6,368,221 | B1 | 4/2002 | Sudau | |
| 6,770,007 | B2 | 8/2004 | Fox | |
| 6,964,155 | B2 * | 11/2005 | McCune et al. | 60/226.1 |
| 6,994,651 | B2 * | 2/2006 | Fox et al. | 475/335 |
| 7,056,259 | B2 | 6/2006 | Fox | |
| 7,297,086 | B2 * | 11/2007 | Fox | 475/331 |
| 7,537,537 | B2 | 5/2009 | Smet et al. | |
| 8,020,665 | B2 * | 9/2011 | Sheridan et al. | 184/6.12 |
| 8,216,108 | B2 * | 7/2012 | Montestruc | 475/346 |
| 8,308,602 | B2 * | 11/2012 | Hicks | 475/331 |
| 2003/0073537 | A1 | 4/2003 | Lloyd | |
| 2008/0194378 | A1 | 8/2008 | Fox | |
| 2008/0269007 | A1 | 10/2008 | Cunliffe et al. | |
| 2008/0274849 | A1 | 11/2008 | Smook et al. | |
| 2009/0163316 | A1 | 6/2009 | Saenz De Ugarte et al. | |
| 2009/0170655 | A1 | 7/2009 | Seanz De Ugarte et al. | |

(Continued)

FOREIGN PATENT DOCUMENTS

| | | |
|---|---|---|
| EP | 3894 A1 * | 9/1979 |
| JP | 58-203521 A | 11/1983 |
| JP | 2008-089126 a | 4/2008 |
| WO | WO 2009083657 A1 * | 7/2009 |

OTHER PUBLICATIONS

Search Report issued in connection with EP Application No. 121801513.3, Oct. 16, 2012.

*Primary Examiner* — Tisha Lewis
(74) *Attorney, Agent, or Firm* — Dority & Manning, PA

(57) ABSTRACT

A pin for coupling a planet gear to a carrier in a planetary gear system is disclosed. The pin includes a first end, a second end, and an outer surface extending between the first end and the second end. In some embodiments, the pin further includes means for modifying the compliance of the pin at an interface between the pin and the carrier. In other embodiments, the pin further include a compliance feature defined in the outer surface, the compliance feature allowing greater compliance of the pin in the tangential direction than in the radial direction.

17 Claims, 5 Drawing Sheets

(56) References Cited

U.S. PATENT DOCUMENTS

| | | |
|---|---|---|
| 2010/0197445 A1 | 8/2010 | Montestruc |
| 2010/0277056 A1* | 11/2010 | Kostka et al. ............... 313/489 |
| 2010/0292044 A1 | 11/2010 | Lahtinen et al. |
| 2010/0303626 A1 | 12/2010 | Mostafi |
| 2010/0331140 A1 | 12/2010 | McCune |
| 2011/0039654 A1* | 2/2011 | Fox et al. .................. 475/346 |
| 2011/0082005 A1* | 4/2011 | Fox et al. .................. 475/347 |
| 2012/0040797 A1* | 2/2012 | Fox .............................. 475/347 |
| 2012/0184404 A1* | 7/2012 | Chobot et al. ............... 475/347 |

* cited by examiner

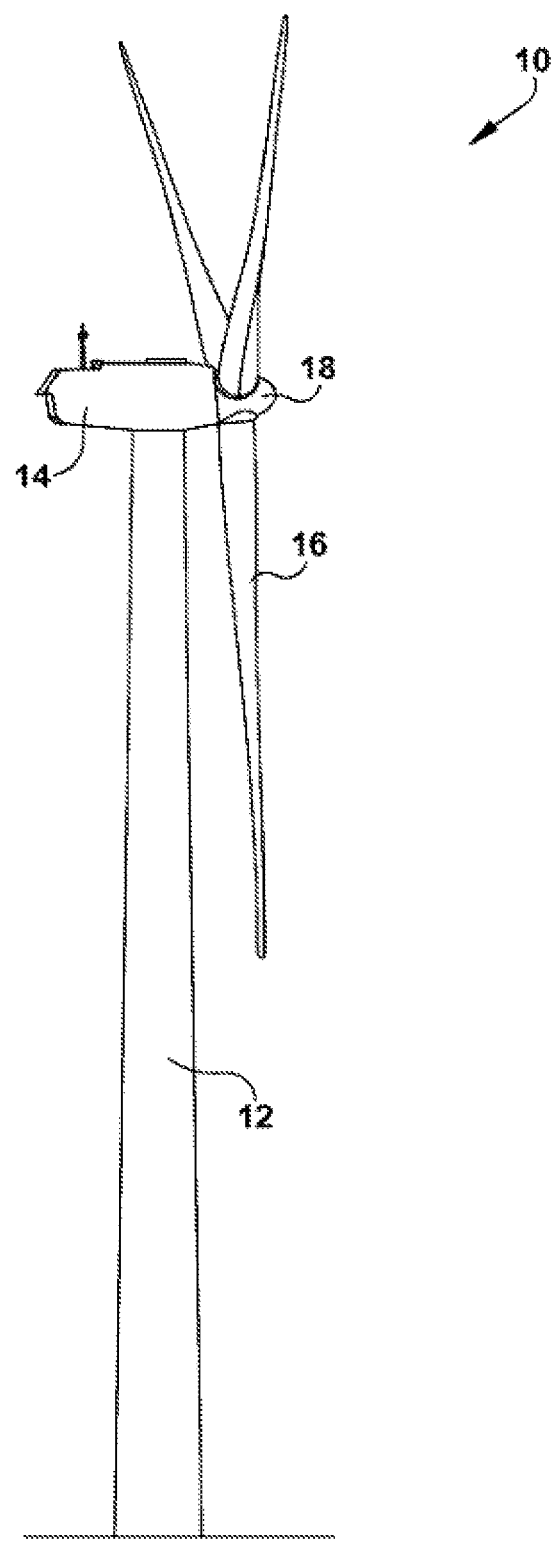
FIG. -1-

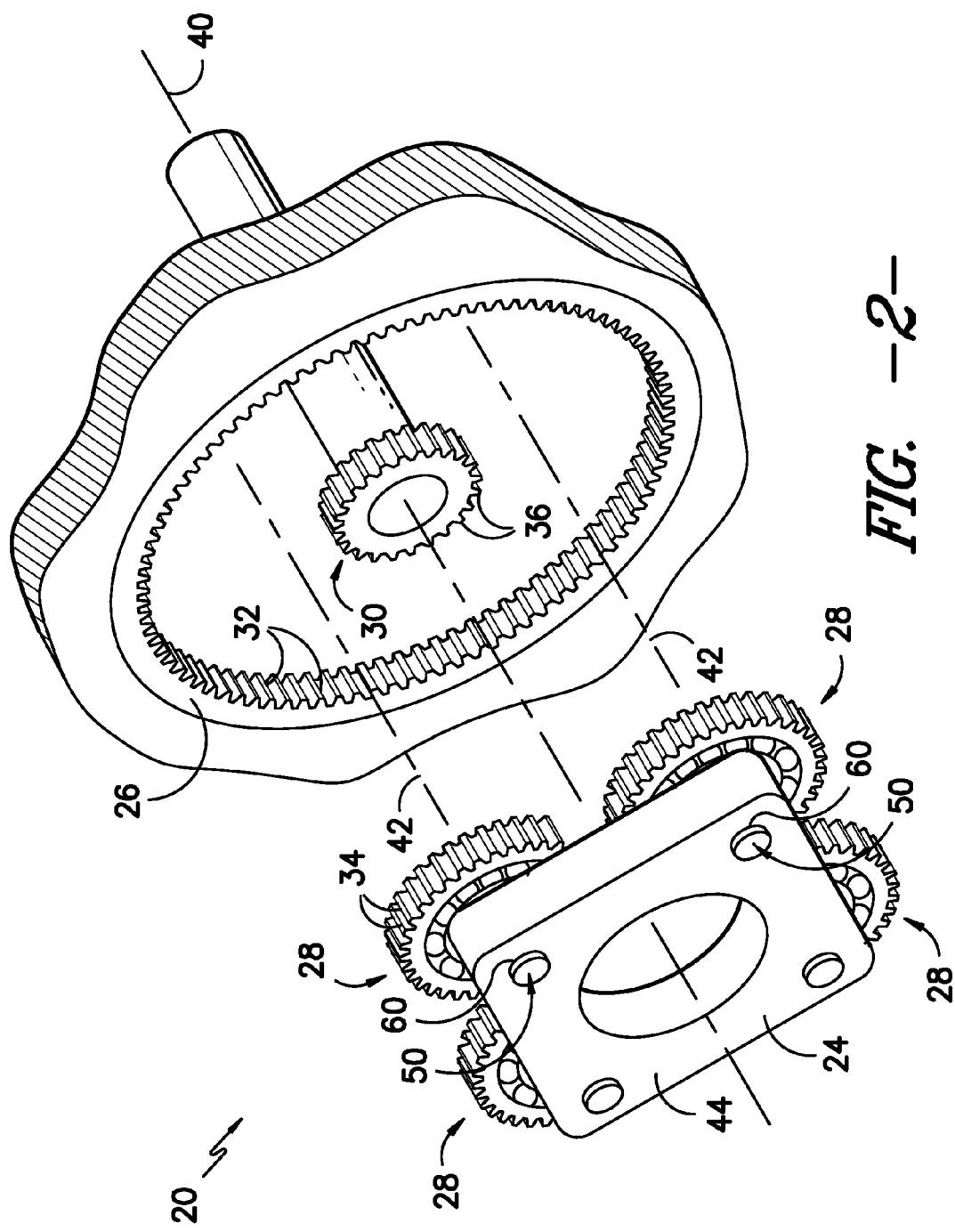
FIG. -2-

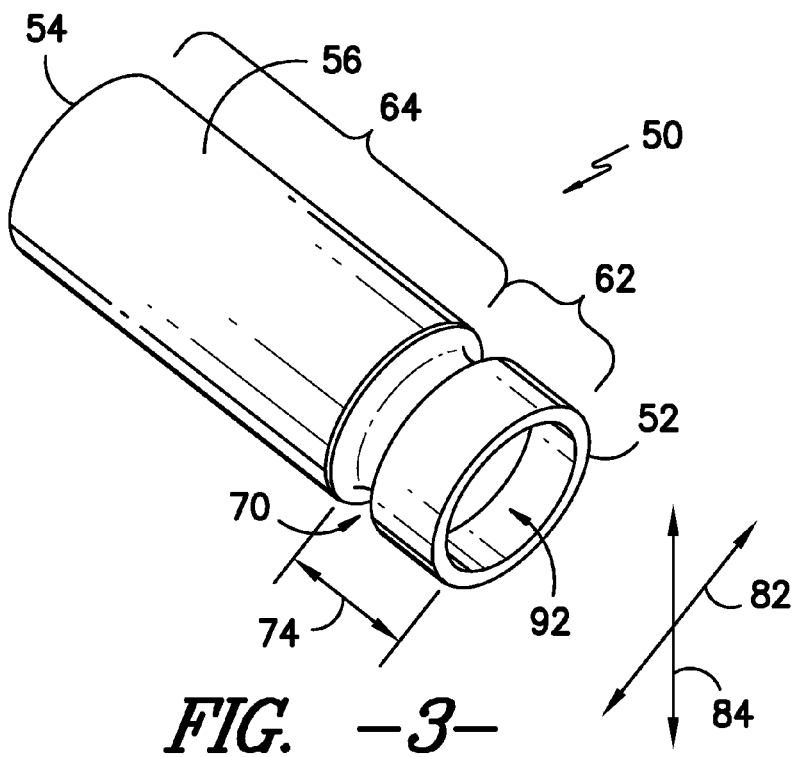
FIG. -3-
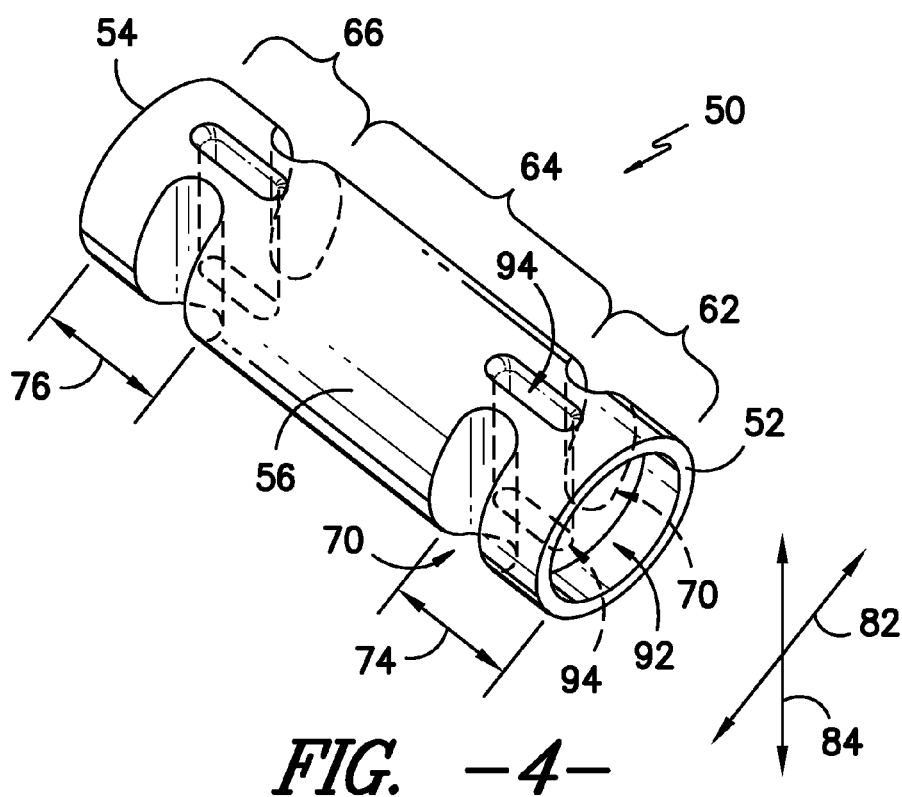
FIG. -4-

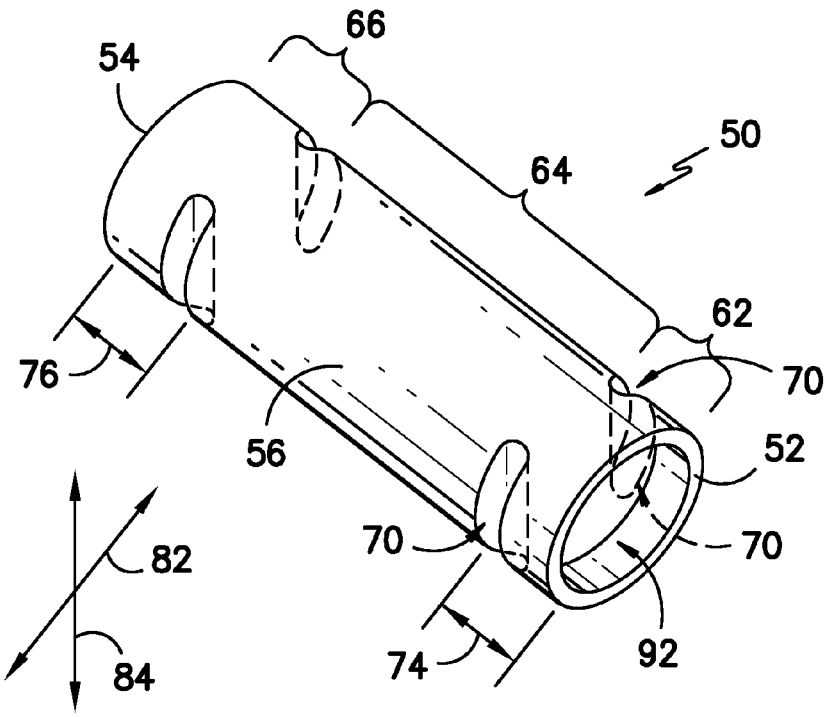
FIG. -5-
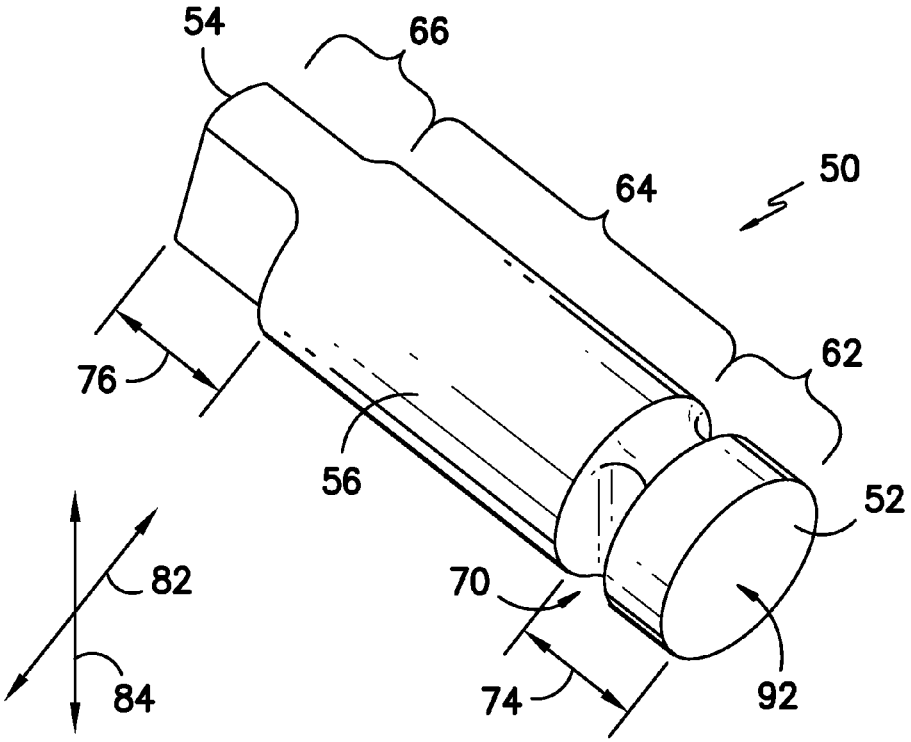
FIG. -6-

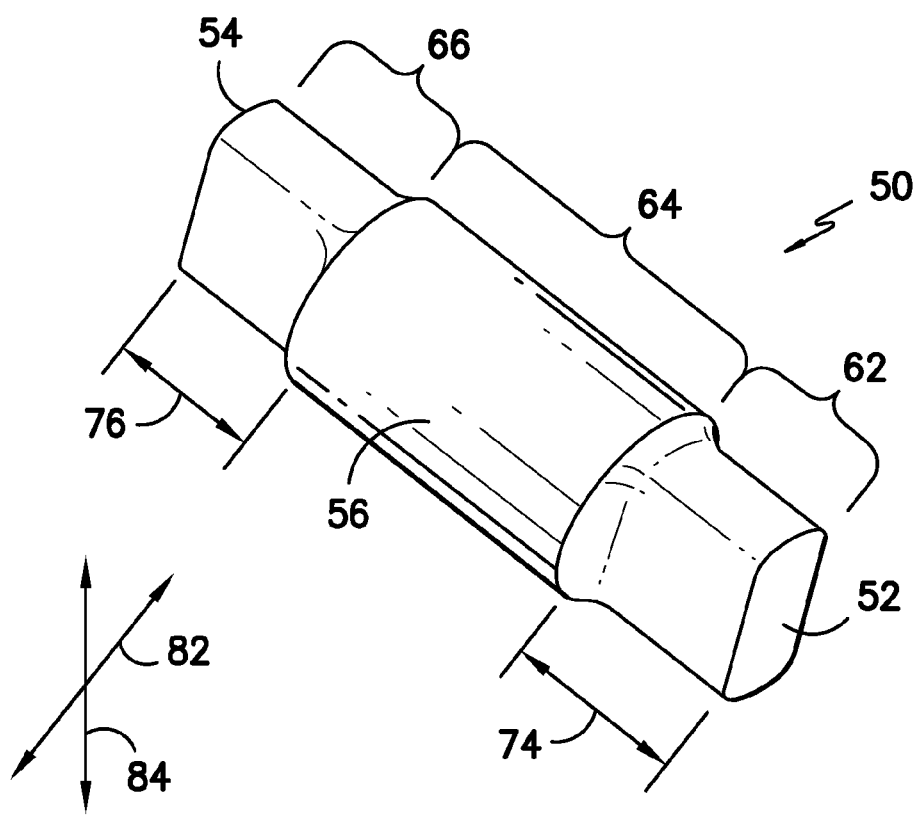
FIG. -7-

PIN FOR PLANETARY GEAR SYSTEM

FIELD OF THE INVENTION

The present disclosure relates in general to planetary gear systems, and more particularly to compliant pins that couple planet gears to carriers in planetary gear systems.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known foil principles. The rotor blades transmit the kinetic energy in the form of rotational energy so as to turn a shaft coupling the rotor blades to a gear system, or if a gear system is not used, directly to the generator. The generator then converts the mechanical energy to electrical energy that may be deployed to a utility grid.

Proper alignment of the meshing teeth of adjacent gears in a gear system, and in particular a planetary gear system, is important for the proper distribution of loads. However, in many current gear systems, various design and operational factors prevent proper alignment of the meshing teeth. For example, manufacturing and design tolerances for the various gears, which typically have involute gear profiles with involute gear teeth, can cause misalignment between the meshing teeth of the adjacent gears. Further, and in particular for gear systems in wind turbines, various components of the gear system such as the carrier experience twisting and/or bending during operation. This twisting and bending is typically caused by loading of an input shaft of the gear system and twisting and bending thereof. Twisting and bending can cause additional misalignment between the meshing teeth of the adjacent gears in the gear system.

Misalignments between adjacent gears in a gear system can have potentially catastrophic results for the gear system and, in wind turbine settings, for the wind turbine itself. For example, misalignments can cause the loads experienced by various gears in the gear system to increase by two or more times the designed loading limits. Thus, the gears that experience this increased loading can become damaged or fail during operation of the gear system, potentially resulting in failure of the gear system.

Thus, an improved gear system, such as an improved planetary gear system, would be desired in the art. For example, a gear system with improved load distribution features would be advantageous.

BRIEF DESCRIPTION OF THE INVENTION

Aspects and advantages of the invention will be set forth in part in the following description, or may be obvious from the description, or may be learned through practice of the invention.

In one embodiment, a pin for coupling a planet gear to a carrier in a planetary gear system is disclosed. The pin includes a first end, a second end, and an outer surface extending between the first end and the second end. The pin further includes means for modifying the compliance of the pin at an interface between the pin and the carrier.

In another embodiment, a pin for coupling a planet gear to a carrier in a planetary gear system is disclosed. The pin includes a first end, a second end, and an outer surface extending between the first end and the second end. The pin further include a compliance feature defined in the outer surface, the compliance feature allowing greater compliance of the pin in the tangential direction than in the radial direction.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a perspective view of a wind turbine according to one embodiment of the present disclosure;

FIG. 2 is an exploded perspective view of a planetary gear system according to one embodiment of the present disclosure;

FIG. 3 is a perspective view of a pin according to one embodiment of the present disclosure;

FIG. 4 is a perspective view of a pin according to another embodiment of the present disclosure;

FIG. 5 is a perspective view of a pin according to another embodiment of the present disclosure;

FIG. 6 is a perspective view of a pin according to another embodiment of the present disclosure; and, FIG. 7 is a perspective view of a pin according to another embodiment of the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 illustrates a wind turbine 10 of conventional construction. The wind turbine 10 includes a tower 12 with a nacelle 14 mounted thereon. A plurality of rotor blades 16 are mounted to a rotor hub 18, which is in turn connected to a main flange that turns a main rotor shaft, as discussed below. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

FIG. 2 illustrates one embodiment of a planetary gear system 20 according to the present disclosure. An input shaft (not shown) may provide an input load to the system 20. In embodiments wherein the system 20 is included in a wind turbine 10, the system 20 may provide an output load to a generator (not shown), as is generally known in the art. Thus, during operation, input load at an input rotational speed is transmitted through the planetary gear system 20 and provided as output load at output rotational speed to the generator.

During operation, the input shaft may be subjected to a variety of loads. For example, the input shaft may experience bending loads during operation. The planetary gear system 20 of the present disclosure, as discussed below, advantageously includes improved load distribution features. These load distribution features may reduce or prevent the various components of the planetary gear system from experiencing increased loading due to misalignment caused by transmission of the bending loads or other loads thereto. Additionally, these load distribution features may reduce or prevent the various components of the planetary gear system from experiencing increased loading due to misalignment caused by manufacturing and design tolerances. By reducing or preventing such increased loading of the various components of the system 20, such as the various gears, the improved load distribution features may increase the life of the system 20 and, in some embodiments, a wind turbine 10 in which the system 20 is incorporated.

In exemplary embodiments, the planetary gear system 20 is a single stage planetary gear system 20. Thus, the input rotational speed may be converted to the output rotational speed through a single stage of various mating gears, as discussed below. Alternatively, however, the planetary gear system 20 may be a multiple stage planetary gear system 20, and the input rotational speed may be converted to the output rotational speed through multiple stages of various mating gears.

The planetary gear system 20 includes a carrier 24 and a plurality of gears. For example, the planetary gear system 20 in exemplary embodiments as shown includes a ring gear 26, one or more planet gears 28, and a sun gear 30. The system 20 may include one, two, three, four, five, six, seven, eight, or more planet gears 28. Each of the gears 26, 28, 30 includes a plurality of teeth. For example, the ring gear 26 includes teeth 32, each planet gear 28 includes teeth 34, and each sun gear 30 includes teeth 36. The teeth 32, 34, and 36 are sized and shaped to mesh together such that the various gears 26, 28, 30 engage each other. For example, the ring gear 26 and the sun gear 30 may each engage the planet gears 28.

In some embodiments, the carrier 24 may be stationary. In these embodiments, the input shaft may be coupled to the ring gear 26, and input loads on the input shaft may be transmitted through the ring gear 26 to the planet gears 28. Thus, the ring gear 26 may drive the system 20. In other embodiments, the ring gear 26 may be stationary. In these embodiments, the input shaft may be coupled to the carrier 24, and input loads on the input shaft may be transmitted through the carrier 24 to the planet gears 28. Thus, the carrier 24 may drive the system 20. In still further embodiments, any other suitable component, such as a planet gear 28 or sun gear 30, may drive the system 20.

The sun gear 30 in exemplary embodiments defines a central axis 40, and thus rotates about this central axis 40. The ring gear 26 may at least partially surround the sun gear 30, and be positioned along the central axis 40. For example, the ring gear 26 may be aligned with the sun gear 30 along the central axis 40, or may be offset from the sun gear 30 along the axis 40. The ring gear 26 may (if rotatable) thus rotate about the central axis 40.

Each of the planet gears 28 may be disposed between the sun gear 30 and the ring gear 26, and may engage both the sun gear 30 and the ring gear 26. For example, the teeth 32, 34, and 36 may mesh together, as discussed above. Further, each of the planet gears 28 may define a central planet axis 42, as shown. Thus, each planet gear 28 may rotate about its central planet axis 42. Additionally, the planet gears 28 and central planet axes 42 thereof may rotate about the central axis 40.

The carrier 24 may be disposed adjacent the planet gears 28, and may further be positioned along the central axis 40. The carrier 24 may include a first carrier plate 44 and, in some embodiments, a second carrier plate (not shown). In embodiments wherein the carrier 24 includes both a first carrier plate 44 and a second carrier plate, the planet gears 28 may be disposed therebetween.

Each planet gear 28 according to the present disclosure may be coupled to the carrier 24. For example, a pin 50 may extend through at least a portion of the carrier 24 and planet gear 28 to couple the planet gear 28 and carrier 24 together. The pin 50 may extend and be positioned along the central planet axis 42, such that the planet gear 28 may rotate about the pin 50.

As shown in FIGS. 3 through 7, a pin 50 may include a first end 52, a second end 54, and an outer surface 56 extending therebetween. The pin 50 may further include various means for modifying, such as increasing or decreasing, the compliance of the pin 50. These means may advantageously provide improved load distribution features to the planetary gear system 20. For example, such means according to the present disclosure may allow a pin 50 to be compliant during operation of the system 20. Such compliance may allow the various gears of the system 20 to maintain proper alignment with one another during operation despite manufacturing and design tolerances of the various gears and despite loading of the system 20. This can improve both load distribution among the various planet gears 28 and load distribution along and about the face of a planet gear 28.

Such means for modifying the compliance of a pin 50 may include a compliance feature defined in the outer surface 56. FIGS. 3 through 7 illustrate various embodiments of compliance features, as discussed below. Further, the means for modifying the compliance of a pin 50 may be defined at any suitable location on the outer surface 56 of the pin 50. For example, in some embodiments, such means may be located at an interface between the pin 50 and the carrier 24, such as the first carrier plate 44 and/or the second carrier plate, as discussed below. In other embodiments, such means may be located at an interface between the pin 50 and planet gear 28, or at any other suitable location on the outer surface 56 of the pin 50.

An interface between the pin 50 and carrier 24 may be defined between an inner surface (not shown) of a pin bore 60 of the carrier 24 and a portion of the outer surface 56 of the pin 50. For example, the outer surface 56 may include a first end surface 62 extending from the first end 52. The first end surface 62 may be configured for interfacing with the carrier 24, and may thus interface with the carrier 24 when inserted into the pin bore 60 of the carrier 24. In particular, the first end surface 62 may be sized and shaped to fit within the pin bore 60.

The outer surface 56 may further include an intermediate surface 64. The intermediate surface 64 may extend from the first end surface 62. In some embodiments, the intermediate surface 64 may extend from the first end surface 62 to the second end 54. In these embodiments, the pin 50 may be cantilevered, as discussed below. In other embodiments, the outer surface 56 may further include a second end surface 66. The second end surface 66 may extend between the intermediate surface 64 and the second end 54. In these embodiments, the first end surface 62 may interface with the first carrier plate 44 and the second end surface 66 may interface with the second carrier plate.

In some embodiments, a pin 50 according to the present disclosure may be fixidly mounted to the carrier 24. For example, the pin 50 may be press-fit into the carrier 24, or may be secured with an adhesive or mechanical fastener, or may be otherwise fixidly mounted thereto. Alternatively, however, a pin 50 may be movably mounted to the carrier 24, such that the pin 50 is rotatable with respect to the carrier 24.

In some embodiments, only one of the first end 52 or the second end 54 is supported. For example, the first end 52 may be supported by the first carrier plate 44 and the second end 54 unsupported by the second carrier plate. Alternatively, the first end 52 may be unsupported and the second end 54 supported. Support of only one end of the pin 50 such that the pin 50 is a cantilevered pin 50 may further increase the compliance of the pin 50. In alternative embodiments, both the first end 52 and second end 54 may be supported, such as by first carrier plate 44 and second carrier plate.

FIGS. 3 through 6 illustrate various embodiments of channels 70 for modifying the compliance of a pin 50. For example, as shown, one or more channels 70 may be defined in the outer surface 56, such as in the first end surface 62, the second end surface 66, and/or the intermediate surface 64. In some embodiments, as shown, one or more of the channels 70 may extend generally annularly about at least a portion of a periphery of the outer surface 56 or portion thereof. For example, FIGS. 3 and 6 illustrate a channel 70 defined in the first end surface 62 and extending generally annularly about the entire periphery of the outer surface 56. FIGS. 4 and 5 illustrate a plurality of channels 70 defined in the first end surface 62 and the second end surface 66, each channel 70 extending generally annularly about a portion of the periphery of the respective portions of the outer surface 56.

In some embodiments, as shown in FIGS. 3, 4, and 6, a channel 70 may be a closed channel 70. In these embodiments, the outer surface 56 is generally continuous through the channel 70, such that there are generally no breaks or openings in the channel 70. In other embodiments, as shown in FIG. 5, a channel 70 may be an open channel 70. In these embodiments, the outer surface 56 is not continuous through the channel 70, and rather includes a break or opening therein.

Notably, various of the embodiments illustrating channels 70 defined in pins 50 thus further illustrate the outer surface 56 or portion thereof having a reduced cross-sectional profile. In other words, a reduced cross-sectional profile portion is defined by the channel or channels 70. FIGS. 6 and 7 illustrate other various embodiments of a pin 50 including an outer surface 56 or portion thereof having a reduced cross-sectional profile. Particularly, FIGS. 6 and 7 illustrate outer surfaces 56 or portions thereof having reduced cross-sectional profiles that do not define channels. For example, as shown, the first end surface 62 and/or the second end surface 66 may have reduced cross-sectional profiles. These reduced cross-sectional profiles may extend through at least a portion of an axial length 74 and/or 76 of the respective first end surface 62 and/or second end surface 66. Further, the reduced cross-sectional profiles may extend to the first end 52 and/or second end 54.

Further, in some embodiments, a portion of the outer surface 56 including the reduced cross-sectional profile may have a taper. For example, the first end surface 62 and/or second end surface 66 may taper throughout a portion of or the entire reduced cross-sectional profile.

In some exemplary embodiments, the means for modifying the compliance of the pin 50, such as the compliance features, may allow greater compliance of the pin 50 in one direction than in another direction. FIGS. 4 through 7 illustrate various embodiments wherein greater compliance is allowed in the tangential direction 82 (i.e. linearly in the tangential direction or rotationally about the radial direction) than in the radial direction 84 (i.e. linearly in the radial direction or rotationally about the tangential direction). It should be understood, however, that the present disclosure is not limited to increased compliance in the tangential direction as opposed to the radial direction, and rather that any suitable increased or decreased compliance in one direction as opposed to another direction is within the scope and spirit of the present disclosure.

For example, FIGS. 4 and 5 illustrate opposing channels 70 that are positioned on opposite sides of the pin 50. In these embodiments, no channels 70 or other features connect these opposing channels 70. The opposing channels 70 allow increased compliance in a direction through the opposing channels 70, such as tangential direction 82 as shown, as opposed to in a direction generally perpendicular to the opposing channels 70, such as radial direction 84.

FIG. 6 illustrates a channel 70 extending annularly about the entire periphery of the outer surface 56 or portion thereof. Further, as shown, opposing portions of the channel 70 are deeper than other opposing portions 70. These variations in channel 70 depth allow increased compliance in a direction through the deeper portions, such as tangential direction 82 as shown, as opposed to in a direction generally perpendicular to the deeper portions and/or in a direction through the shallower portions, such as radial direction 84.

FIGS. 6 and 7 illustrate portions of the outer surface 56 having reduced cross-sectional profiles. Further, as shown, opposing portions of the surface 56 or portion thereof may have a larger reduction than other opposing portions. These variations in the size of the reduction in cross-section allow increased compliance in a direction through the areas with larger reductions, such as tangential direction 82 as shown, as opposed to in a direction generally perpendicular to the areas with larger reductions and/or in a direction through the areas with smaller reductions, such as radial direction 84.

In some embodiments, various other features may be included on or defined in the pin 50 to modify, such as increase, the compliance of the pin 50. For example, a pin 50 may define one or more bore holes. Each bore hole may extend at least partially through the pin 50. For example, as shown in FIGS. 3 and 5, a bore hole 92 may extend along the central planet axis 42. In some embodiments, a bore hole 92 may extend from the second end 54 towards the first end 52, while in other embodiments, a bore hole 92 may extend from the first end 52 towards the second end 54. Additionally or alternatively, as shown in FIG. 4, a bore hole 94 may extend generally transverse to the central planet axis 42 and through the outer surface 56 or any portion thereof. Such bore holes 92 and/or 94 reduce the amount of material necessary to form the pin 50, and may further increase the compliance of the pin 50.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A pin for coupling a planet gear to a carrier in a planetary gear system, the pin comprising:
   a first end;
   a second end;
   an outer surface extending between the first end and the second end, wherein the outer surface comprises a first end surface extending from the first end and an intermediate surface extending from the first end surface, the first end surface configured for interfacing with the carrier;
   means for modifying the compliance of the pin at an interface between the pin and the carrier; and
   a closed bore hole extending through the first end surface generally transverse to a central planet axis of the pin.

2. The pin of claim 1, wherein the outer surface further comprises a second end surface extending between the intermediate surface and the second end, the second end surface configured for interfacing with the carrier.

3. The pin of claim 1, wherein the means comprises a channel defined in the first end surface, the channel extending annularly about at least a portion of a periphery of the first end surface.

4. The pin of claim 3, further comprising a plurality of channels.

5. The pin of claim 3, wherein the channel is open.

6. The pin of claim 3, wherein the channel is closed.

7. The pin of claim 1, wherein the means comprises the first end surface having a reduced cross-sectional profile through at least a portion of an axial length of the first end surface.

8. The pin of claim 7, wherein the first end surface tapers throughout at least a portion of the reduced cross-sectional profile.

9. The pin of claim 1, wherein the pin further defines a bore hole, the bore hole extending from the first end generally along a central planet axis and at least partially through the pin.

10. The pin of claim 1, wherein the means allows greater compliance of the pin in the tangential direction than in the radial direction.

11. A pin for coupling a planet gear to a carrier in a planetary gear system, the pin comprising:
    a first end;
    a second end;
    an outer surface extending between the first end and the second end, wherein the outer surface comprises a first end surface extending from the first end and an intermediate surface extending from the first end surface, the first end surface configured for interfacing with the carrier; and,
    a compliance feature defined in the first end surface, the compliance feature allowing greater compliance of the pin in the tangential direction than in the radial direction, wherein the compliance feature comprises the outer surface having a reduced cross-sectional profile through at least a portion of an axial length of the outer surface.

12. The pin of claim 11, wherein the compliance feature comprises a channel, the channel extending annularly about at least a portion of a periphery of the outer surface.

13. The pin of claim 12, further comprising a plurality of channels.

14. The pin of claim 11, wherein the outer surface tapers throughout at least a portion of the reduced cross-sectional profile.

15. The pin of claim 11, wherein the pin further defines a bore hole, the bore hole extending from the first end generally along a central planet axis and at least partially through the pin.

16. The pin of claim 11, wherein the pin further defines a bore hole, the bore hole extending through the outer surface generally transverse to a central planet axis.

17. A pin for coupling a planet gear to a carrier in a planetary gear system, the pin comprising:
    a first end;
    a second end;
    an outer surface extending between the first end and the second end, the outer surface comprising a first end surface extending from the first end and an intermediate surface extending from the first end surface, the first end surface configured for interfacing with the carrier;
    means for modifying the compliance of the pin at an interface between the pin and the carrier, the means comprising an open channel defined in the first end surface, the channel extending annularly about at least a portion of an outer periphery of the first end surface.

* * * * *